United States Patent
Luo

(10) Patent No.: US 8,472,126 B2
(45) Date of Patent: Jun. 25, 2013

(54) ZOOM LENS

(75) Inventor: Yang-Cheng Luo, Guangdong (CN)

(73) Assignees: Premier Image Technology(China) Ltd., Foshan (CN); Hon Hai Precision Industry Co., Ltd., New Taipei (TW)

(*) Notice: Subject to any disclaimer, the term of this patent is extended or adjusted under 35 U.S.C. 154(b) by 119 days.

(21) Appl. No.: 13/280,307

(22) Filed: Oct. 24, 2011

(65) Prior Publication Data

US 2013/0077179 A1  Mar. 28, 2013

(30) Foreign Application Priority Data

Sep. 22, 2011 (CN) .............................. 201110283616

(51) Int. Cl.
*G02B 15/14* (2006.01)
*G02B 15/177* (2006.01)

(52) U.S. Cl.
USPC ......................................... 359/689; 359/686

(58) Field of Classification Search
USPC ................................................. 359/686, 689
See application file for complete search history.

(56) References Cited

U.S. PATENT DOCUMENTS

| | | | |
|---|---|---|---|
| 8,000,023 B2 | 8/2011 | Chou et al. | |
| 2007/0171544 A1* | 7/2007 | Noda | 359/689 |
| 2009/0097131 A1* | 4/2009 | Iijima | 359/684 |
| 2010/0033834 A1* | 2/2010 | Matsusaka et al. | 359/682 |
| 2010/0128364 A1* | 5/2010 | Agatsuma | 359/689 |
| 2010/0157439 A1* | 6/2010 | Luo | 359/689 |
| 2010/0265362 A1* | 10/2010 | Matsuo | 348/240.3 |
| 2011/0170202 A1* | 7/2011 | Tomioka | 359/684 |

* cited by examiner

*Primary Examiner* — Jordan Schwartz
*Assistant Examiner* — William Alexander
(74) *Attorney, Agent, or Firm* — Altis Law Group, Inc.

(57) ABSTRACT

A zoom lens includes, in the order from the object-side to the image-side thereof, a first lens group of a negative refractive power, a second lens group of a positive refractive power, and a third lens group of a positive refractive power. The first lens group includes, in the order from the object-side to the image-side thereof, a first lens of negative refractive power, and a second lens of positive refractive power. The second lens group includes, in the order from the object-side to the image-side thereof, a third lens of positive refractive power, a fourth lens of negative refractive power, and a fifth lens of negative refractive power.

3 Claims, 10 Drawing Sheets

ZOOM LENS

BACKGROUND

1. Technical Field

The present disclosure relates to lenses and, particularly, to a zoom lens which has a high zoom ratio, a reduced total length, and a high resolution.

2. Description of Related Art

To obtain small camera modules which provide a high quality image over a large object distance range, a zoom lens having a high zoom ratio, a short total length, and a high resolution is desired.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will now be described in detail with reference to the drawings.

Figure 1:
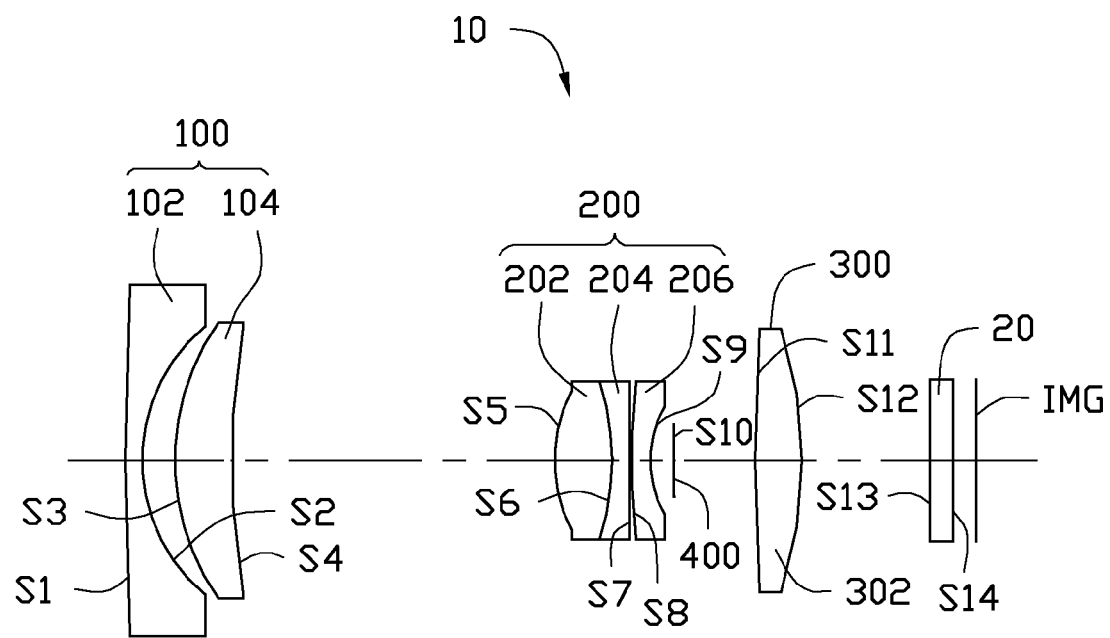
FIG. 1 is a schematic view of a zoom lens, which is in a wide-angle state, according to an embodiment.
Figure 2:
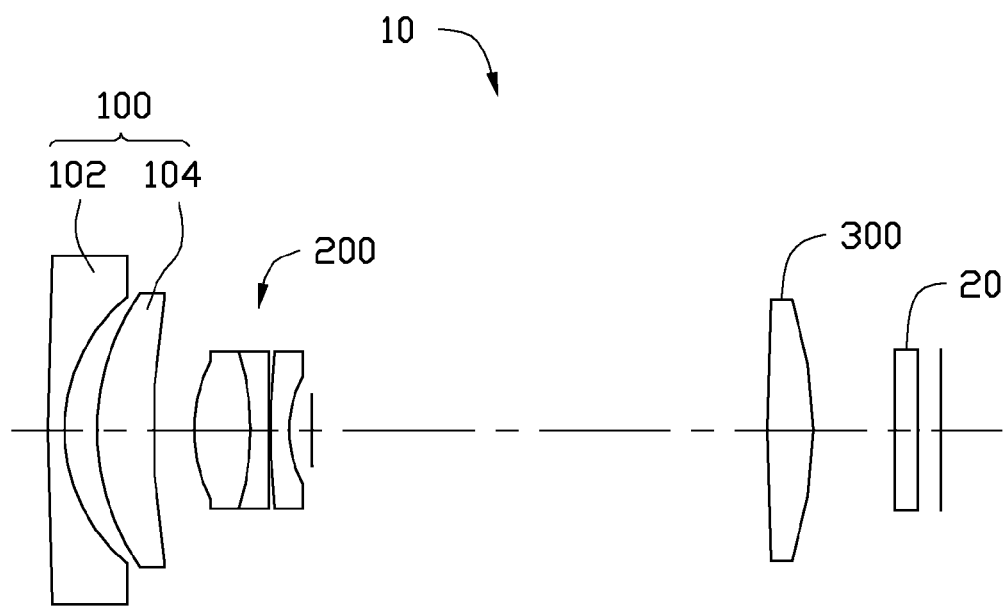
FIG. 2 is similar to FIG. 1, but showing the zoom lens in a telephoto state.
Figure 3:
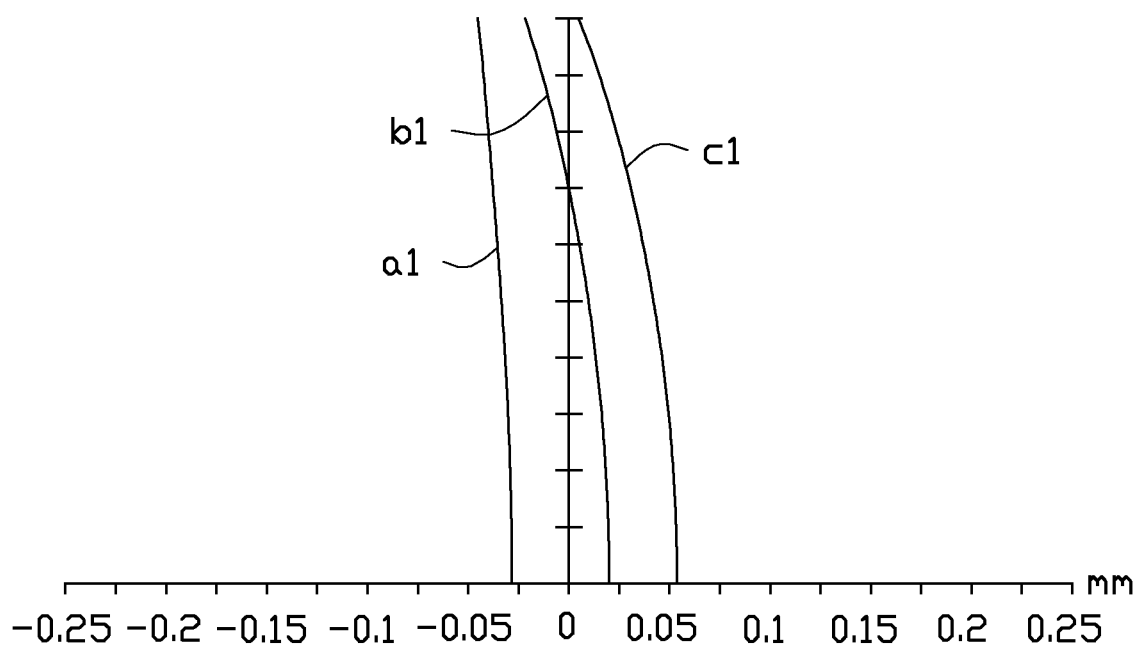
FIGS. 3-6 are graphs respectively showing longitudinal aberration, lateral color aberration, astigmatism and distortion, and ray aberration in the zoom lens of FIG. 1.
Figure 4:
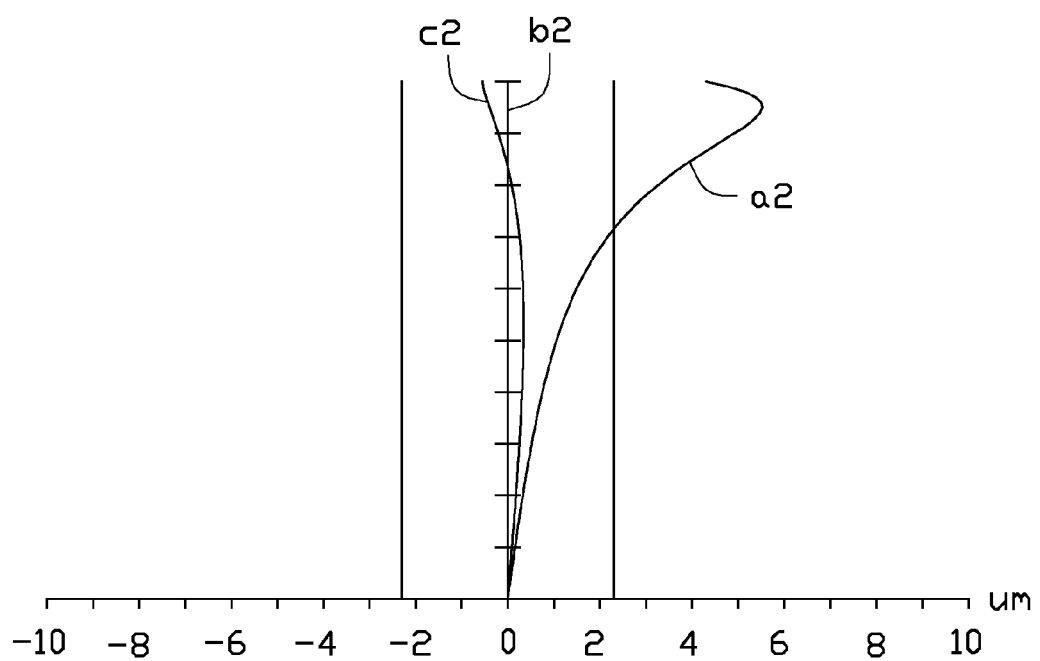

Referring to FIGS. 1-2, a zoom lens 10, according to an embodiment, is used to capture images. The zoom lens 10 includes, in order from the object-side to the image-side thereof, a first lens group 100 of a negative refractive power, a second lens group 200 of a positive refractive power, and a third lens group 300 of a positive refractive power.

The first lens group 100 includes, in order from the object-side to the image-side of the zoom lens 10, a first lens 102 of negative refractive power and a second lens 104 of positive refractive power. The second lens group 200 includes, in order from the object-side to the image-side of the zoom lens 10, a third lens 202 of positive refractive power, a fourth lens 204 of negative refractive power, and a fifth lens 206 of negative refractive power.

The zoom lens 10 satisfies the following condition formulas:

$R5/FW > 0.9$, $2.6 > F1/FW > 2.1$, $1.5 > F2/FW > 2$, $TTL/FW < 1.6$, $25 > VD2 > 20$, $25 > (VD1 - VD2) > 20$, $20 > (VD3 - VD4) > 15$, $23 > VD5 > 28$, and $ND3 > 1.8$, where R5 represents the curvature radius of the object-side surface of the third lens 202, FW represents the effective focal length of the zoom lens 10 which is in a wide-angle state, F1 and F2 are the respective effective focal lengths of the first lens group 100 and the second lens group 200, TTL represents the total length of the zoom lens 10 being the sum of the thicknesses of the first lens group, the second lens group and the third lens group, VD1, VD2, VD3, VD4, VD5 are the Abbe numbers of light at a wavelength of 587.6 nm (Fraunhofer d–, or d light) in the first lens 102, the second lens 104, the third lens 202, the fourth lens 204, and the fifth lens 206, respectively, and ND3 represents the refractive index of d light in the third lens 202.

By satisfying the above-listed condition formulas, the effective focal length of the zoom lens 10 can be changed over a large range by changing the distance between the first lens group 100 and the second lens group 200. In this way, a high zoom ratio can be obtained. In addition, the total length of the camera module and aberrations occurring in the zoom lens 10 can be controlled. As a result, a short total length and a high resolution can be achieved.

When capturing images, light rays enter the zoom lens 10, passing through the first lens group 100, the second lens group 200, and the third lens group 300 in sequence, and then passing through a cover glass 20, and finally forming optical images on an image plane IMG. During the capture, the distance between the first lens group 100 and the second lens group 200 can be adjusted to obtain a suitable effective focal length of the zoom lens 10. After the effective focal length of the zoom lens 10 has been fixed, the third lens group 300 can be moved along the optical axis of the zoom lens 10 to focus the zoom lens 10.

In particular, the first lens 102 is a spherical glass lens, the second lens 104 is an aspheric plastic lens, the third lens 202 and the fourth lens 204 are spherical plastic lenses and are combined using glue, and the fifth lens 206 is an aspheric plastic lens. The third lens group 300 includes a sixth lens 302 of positive refractive power. The sixth lens 302 is an aspheric plastic lens. In such a configuration, no aspheric glass lens is employed, resulting in low cost of the zoom lens 10.

The zoom lens 10 further includes an aperture stop 400 interposed between the second lens group 200 and the third lens group 300. The zoom lens 10 includes, in order form the object-side to the image-side of the zoom lens 10, surfaces S1-S12. The cover glass 20 includes a surface S13 facing the zoom lens 10 and a surface S14 facing away from the zoom lens 10.

The following symbols are used:

F: the effective focal length of the zoom lens;

FNo: focal ratio number;

$2\omega$: field angle;

R: curvature radius of each lens surface;

D: distance between each two adjacent surfaces along the optical axis of the zoom lens 10;

Nd: refractive index of d light in each lens or the cover glass 20; and

Vd: Abbe number of d light in each lens or the cover glass 20

The zoom lens 10 satisfies all the conditions of Table 1:

TABLE 1

| Surface | R(mm) | D(mm) | ND | VD |
|---|---|---|---|---|
| S1 | 121.9544 | 0.56 | 1.804 | 46.570373 |
| S2 | 5.953 | 1.125356 | — | — |
| S3 | 7.400263 | 1.939882 | 1.63272 | 23.239886 |
| S4 | 15.60451 | D4(see Table 3) | — | — |
| S5 | 5.079673 | 1.967807 | 1.882997 | 40.765107 |
| S6 | −8.861559 | 0.6481084 | 1.84666 | 23.77794 |
| S7 | −142.2517 | 0.03 | — | — |
| S8 | 14.13527 | 0.6306749 | 1.607265 | 26.646671 |
| S9 | 3.77912 | 0.8 | — | — |
| S10 | Infinity | D10(see Table 3) | — | — |
| S11 | −529.3648 | 1.6 | 1.531131 | 55.753858 |
| S12 | −11.28365 | 0.2 | — | — |
| S13 | Infinity | 0.3 | 1.516798 | 64.198266 |
| S14 | Infinity | 0.4 | — | — |
| IMG | Infinity | — | — | — |

The aspherical surfaces are shaped according to the formula:

$$x = \frac{ch^2}{1+\sqrt{1-(k+1)c^2h^2}} + \sum A_i h^i,$$

where h is a height from the optical axis of the zoom lens 10 to the aspherical surface, c is a vertex curvature, k is a conic constant, and Ai is the i-th order correction coefficient of the aspherical surface.

The zoom lens 10 satisfies all the conditions of Table 2:

TABLE 2

|  | S3 | S4 | S8 | S9 | S11 | S12 |
|---|---|---|---|---|---|---|
| k | 3.33E−01 | −1.03E+01 | −1.90E+01 | 9.84E−01 | 1.36E+04 | −1.22E+00 |
| A4 | −4.02E−04 | −1.73E−04 | −1.95E−03 | −2.27E−03 | 1.97E−05 | 5.83E−05 |
| A6 | −7.19E−06 | −9.46E−06 | 5.70E−05 | 3.08E−05 | 1.85E−06 | −2.98E−06 |
| A8 | −4.70E−08 | −2.58E−08 | −1.45E−06 | −3.89E−06 | −4.78E−08 | 1.57E−07 |
| A10 | −1.69E−09 | −1.94E−09 | −9.99E−08 | −1.49E−06 | 8.41E−09 | 2.77E−09 |
| A12 | −2.98E−11 | −6.94E−11 | −1.52E−09 | −4.04E−07 | 1.12E−09 | 4.25E−10 |
| A14 | −2.32E−12 | −4.10E−12 | 1.15E−08 | −6.69E−08 | 3.97E−11 | 7.42E−11 |
| A16 | 0.00E+00 | 0.00E+00 | 6.12E−11 | 6.38E−08 | 0.00E+00 | 0.00E+00 |

The zoom lens 10 also satisfies the conditions of Table 3:

TABLE 3

| F | FNo | 2ω | D4(mm) | D10(mm) |
|---|---|---|---|---|
| 5.35 mm | 3.35 | 76° | 14.35 | 4.11 |
| 24.8 mm | 6.59 | 18° | 0.2 | 21.71 |

The values of the condition formulas in this embodiment are listed in Table 4:

TABLE 4

| Condition formula | value |
|---|---|
| R5/FW > 0.9 | 0.95 |
| 2.6 > F1/FW > 2.1 | 2.38 |
| 1.5 > F2/FW > 2 | 1.75 |
| TTL/FW < 1.6 | 1.58 |
| 25 > VD2 > 20 | 23.2 |
| 25 > (VD1 − VD2) > 20 | 23.4 |
| 20 > (VD3 − VD4) > 15 | 17 |
| 23 > VD5 > 28 | 26.6 |
| ND3 > 1.8 | 1.883 |

Figure 5:
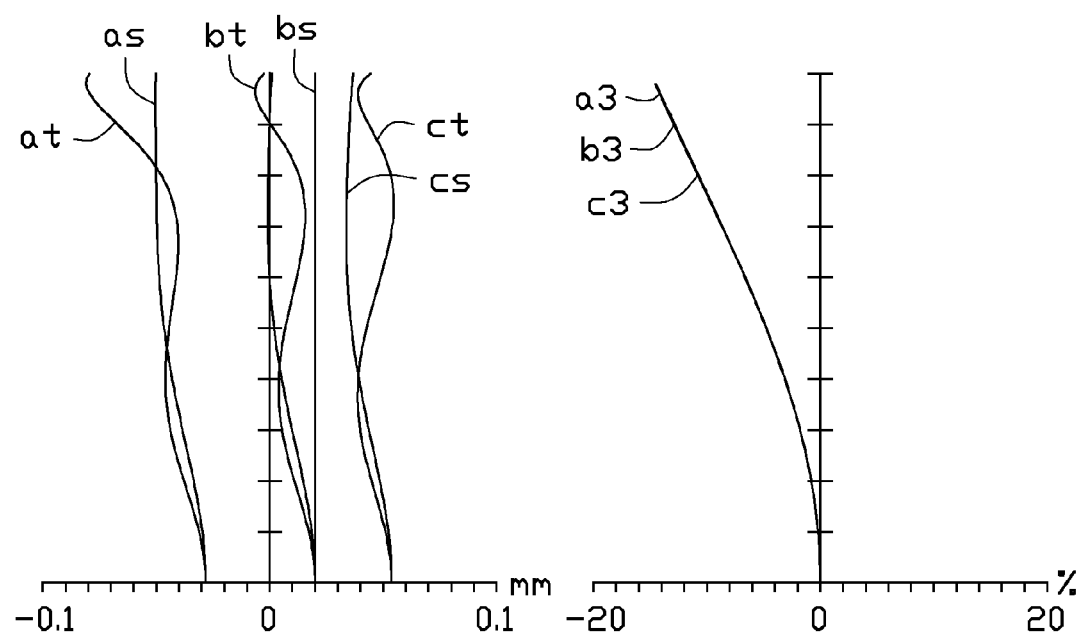
Figure 6:
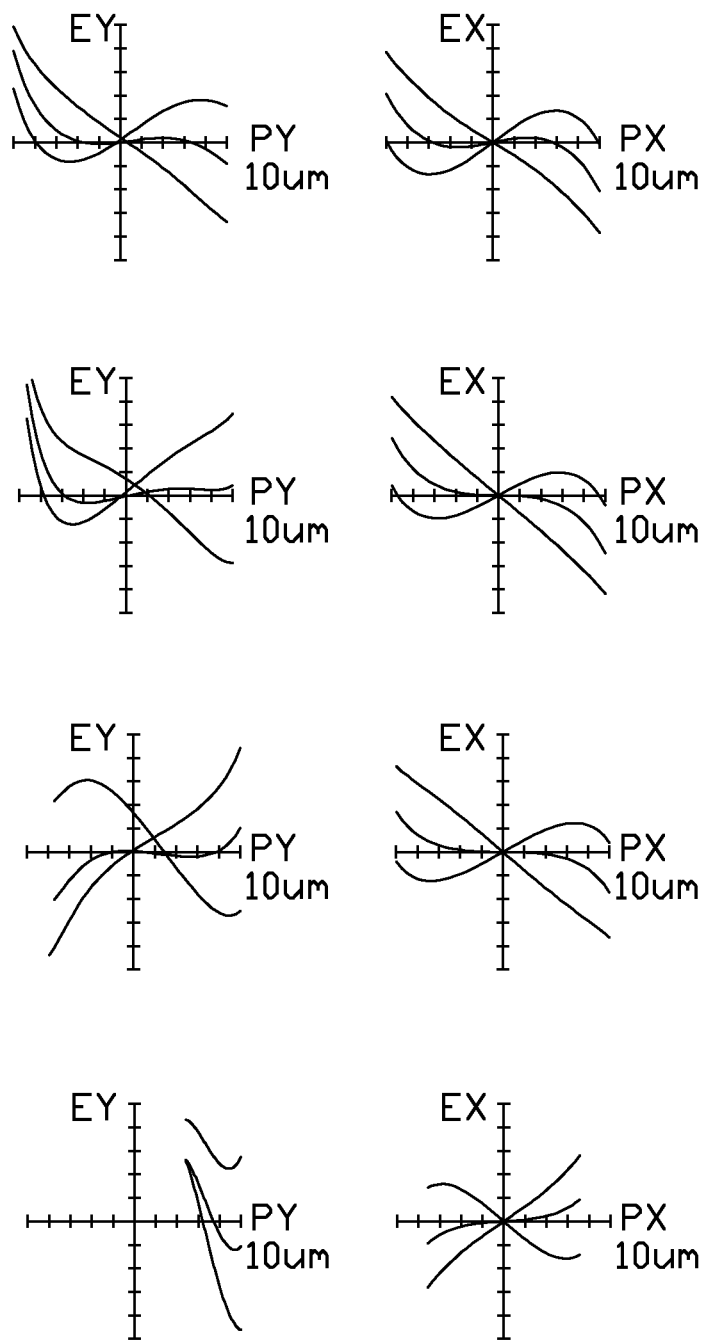
Figure 7:
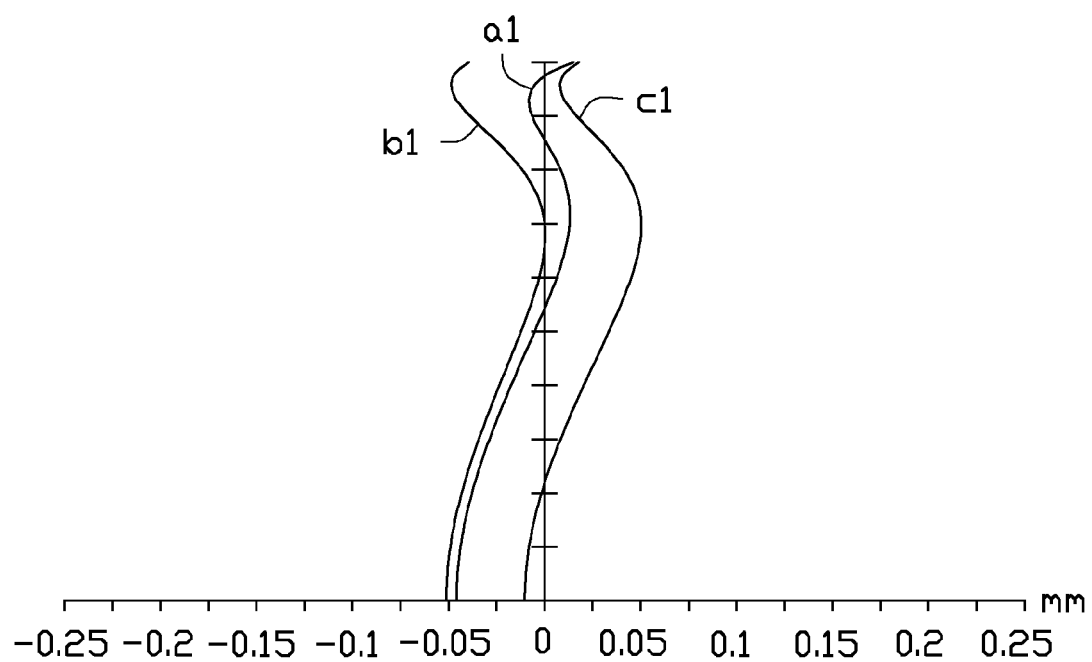
FIGS. 7-10 are graphs respectively showing longitudinal aberration, lateral color aberration, astigmatism and distortion, and ray aberration in the zoom lens of FIG. 2.
Figure 8:
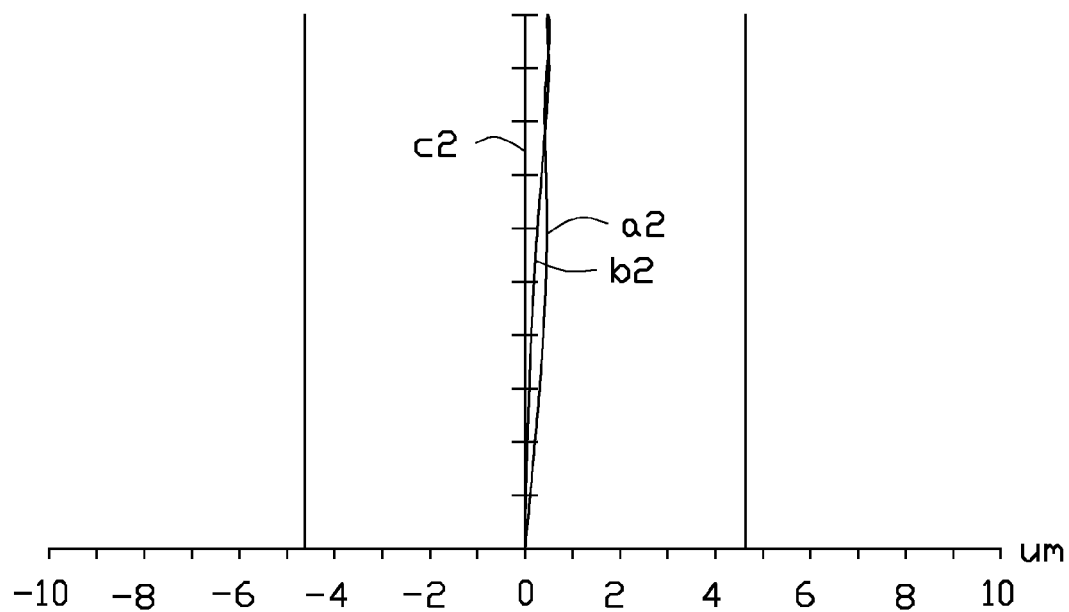
Figure 9:
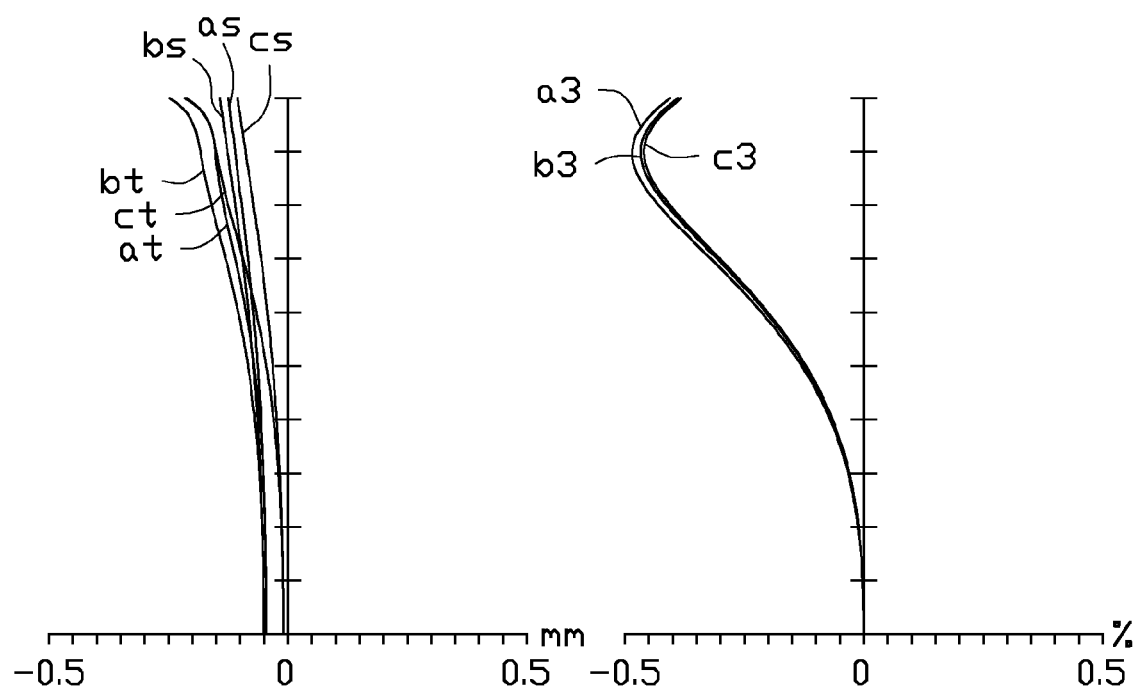
Figure 10:
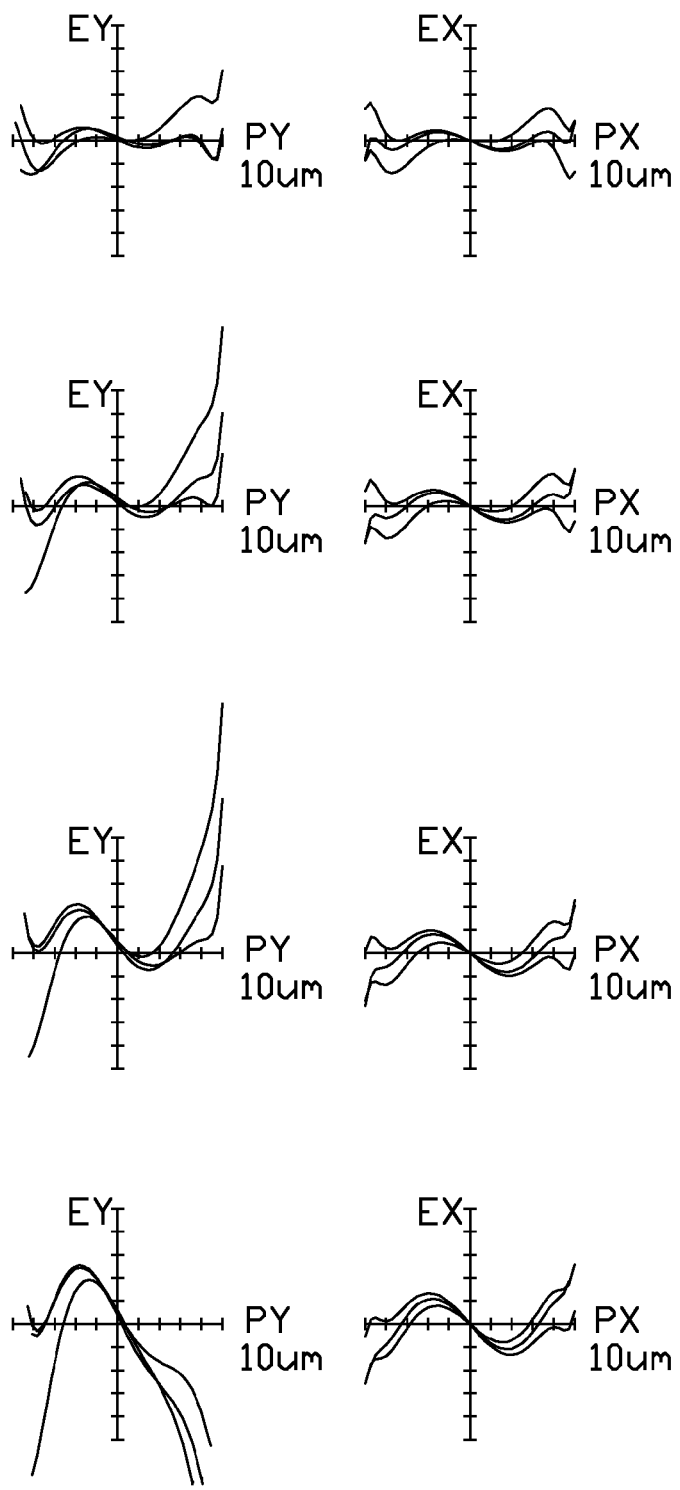

Referring to FIGS. 3-10, curves a1, b1, and c1 show the characteristics of longitudinal aberrations of light at wavelengths of 486 nm, 588 nm, and 656 nm in the zoom lens 10, respectively. Curves a2, b2, and c2 depict the characteristics of lateral color aberrations of light at wavelengths of 486 nm, 588 nm, and 656 nm in the zoom lens 10, respectively. The curves at, as, bt, bs, ct, and cs show the meridional and sagittal field curvatures of light at wavelengths of 486 nm, 588 nm, and 656 nm in the zoom lens 10, respectively. The curves a3, b3, and c3 show the distortional characteristics of light at wavelengths of 486 nm, 588 nm, and 656 nm in the zoom lens 10, respectively. In FIGS. 5 and 10, the graphs arranged from the top to the bottom show the characteristics of ray aberration at ⅓ field, ⅔ field, and the whole field, and, in each graph, the curves correspond to light at wavelengths of 486 nm, 588 nm, and 656 nm. As indicated in FIGS. 3-10, the aberrations otherwise occurring in the zoom lens 10 in both the wide-angle and telephoto states are controlled.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. A zoom lens, comprising, in this order from the object-side to the image-side thereof:
 a first lens group of a negative refractive power, comprising, in the order from the object-side to the image-side of the zoom lens:
  a first lens of negative refractive power, and
  a second lens of positive refractive power, and
 a second lens group of a positive refractive power, comprising, in the order from the object-side to the image-side of the zoom lens:
  a third lens of positive refractive power,
  a fourth lens of negative refractive power, and
  a fifth lens of negative refractive power; and
 a third lens group of a positive refractive power; wherein the zoom lens satisfies the following condition formulas:

$R5/FW>0.9$, $2.6>F1/FW>2.1$, $1.5>F2/FW>2$, $TTL/FW<1.6$, $25>VD2>20$, $25>(VD1-VD2)>20$, $20 > (VD3 - VD4) > 15,$ $23 > VD5 > 28,$ and $ND3 > 1.8,$ where R5 represents a curvature radius of the object-side surface of the third lens, FW represents the effective focal length of the zoom lens which is in a wide-angle state, F1 and F2 are respective effective focal lengths of the first lens group and the second lens group, TTL represents a total length of the zoom lens being the sum of the thicknesses of the first lens group, the second lens group and the third lens group, VD1, VD2, VD3, VD4 and VD5 are Abbe numbers of d light of which a wavelength is about 587.6 nm in the first lens, the second lens, the third lens, the fourth lens, and the fifth lens, respectively, ND3 represents a refractive index of the d light in the third lens.

2. The zoom lens of claim 1, wherein the first lens is a glass spherical lens, the second lens is a plastic aspheric lens, the third lens and the fourth lens are plastic spherical lenses and are combined together, and the fifth lens is a plastic aspheric lens, the third lens group comprises a sixth lens of positive refractive power, and the sixth lens is a plastic aspheric lens.

3. The zoom lens of claim 1, wherein the zoom lens further comprises an aperture stop interposed between the second lens group and the third lens group.

* * * * *